(12) United States Patent
Hsiao et al.

(10) Patent No.: US 12,469,646 B2
(45) Date of Patent: Nov. 11, 2025

(54) THIN-FILM CHIP RESISTOR-CAPACITOR FOR MINIATURIZATION AND THINNING

(71) Applicant: YAGEO CORPORATION, Kaohsiung (TW)

(72) Inventors: Shen-Li Hsiao, Kaohsiung (TW); Kuang-Cheng Lin, Kaohsiung (TW); Po-Hsun Shih, Changhua County (TW)

(73) Assignee: YAGEO CORPORATION, Kaohsiung (TW)

( * ) Notice: Subject to any disclaimer, the term of this patent is extended or adjusted under 35 U.S.C. 154(b) by 525 days.

(21) Appl. No.: 17/938,678

(22) Filed: Oct. 7, 2022

(65) Prior Publication Data
US 2024/0029960 A1    Jan. 25, 2024

(30) Foreign Application Priority Data
Jul. 19, 2022   (CN) .......................... 202210848600.8

(51) Int. Cl.
| | | |
|---|---|---|
| H01G 4/33 | (2006.01) | |
| H01G 4/10 | (2006.01) | |
| H01G 4/40 | (2006.01) | |
| H10D 1/47 | (2025.01) | |
| H10D 1/68 | (2025.01) | |

(52) U.S. Cl.
CPC ............. *H01G 4/33* (2013.01); *H01G 4/10* (2013.01); *H01G 4/40* (2013.01); *H10D 1/47* (2025.01); *H10D 1/692* (2025.01)

(58) Field of Classification Search
None
See application file for complete search history.

(56) References Cited

U.S. PATENT DOCUMENTS

| | | | | |
|---|---|---|---|---|
| 5,923,077 A | * | 7/1999 | Chase | H10D 88/00 |
| | | | | 257/536 |
| 2011/0075319 A1 | * | 3/2011 | Oikawa | H01G 4/33 |
| | | | | 361/303 |
| 2017/0202089 A1 | * | 7/2017 | Yun | H01C 1/148 |
| 2021/0327867 A1 | * | 10/2021 | Bouvier | H03H 3/00 |

FOREIGN PATENT DOCUMENTS

| | | | | |
|---|---|---|---|---|
| CN | 106158371 A | * | 11/2016 | ............... H01G 4/30 |
| JP | 59017232 A | * | 1/1984 | ............... H01G 4/40 |
| TW | 200628025 A | | 8/2006 | |
| TW | 201828443 A | | 8/2018 | |
| TW | 202042365 A | | 11/2020 | |

OTHER PUBLICATIONS

Translation JP 59017232 A (Year: 1984).*
Translation CN 106158371 A (Year: 2016).*

* cited by examiner

*Primary Examiner* — Eric W Thomas
(74) *Attorney, Agent, or Firm* — CKC & Partners Co., LLC

(57) ABSTRACT

A thin-film chip resistor-capacitor includes a substrate, a resistor layer, a dielectric layer, a thin-film capacitor layer, a first terminal electrode and a second terminal electrode. The resistor layer is disposed on the substrate. The dielectric layer is disposed on the resistor layer. The thin-film capacitor layer is disposed on the dielectric layer and includes first and second capacitor electrodes that are physically separated with respect to each other. The first terminal electrode is disposed on a first side edge of the substrate and is coupled to the resistor layer and the first capacitor electrode. The second terminal electrode is disposed on a second side edge of the substrate opposite to the first side edge and is coupled to the resistor layer and the second capacitor electrode.

11 Claims, 8 Drawing Sheets

THIN-FILM CHIP RESISTOR-CAPACITOR FOR MINIATURIZATION AND THINNING

RELATED APPLICATIONS

This application claims priority to Chinese Patent Application Serial Number 202210848600.8 filed Jul. 19, 2022, the entirety of which is incorporated by reference herein.

BACKGROUND

Field of the Invention

The present disclosure relates to a resistor-capacitor device, and more particularly to a thin-film chip resistor-capacitor and a method of fabricating the same.

Description of Related Art

A common resistor-capacitor element is designed by using a resistor and a capacitor in series or in parallel, or by forming a resistor-capacitor coupled electrical component through a low-temperature ceramic cofiring process. For the design of conventional resistor-capacitor elements, usually the size and design area of the resistor and the capacitor are significantly limited in order to achieve circuit miniaturization, which makes it difficult to achieve high resistance as well as high capacitance, and the sustainable power and the heat dissipation performance thereof will be reduced due to its small size. On the other hand, the low temperature ceramic co-firing process is easily affected by the thermophysical properties of the respective components when cofired, resulting in poor production quality.

SUMMARY

The present disclosure provides a thin-film chip resistor-capacitor and a method of fabricating the same, in which an additional thin-film capacitor layer is formed over a resistor layer or a substrate, and the resistor layer and the thin-film capacitor layer are coupled by terminal electrodes to form a resistor-capacitor element, so as to achieve chip thinning as well as miniaturization without sacrificing the resistance and the capacitance thereof.

One aspect of the present disclosure is directed to a thin-film chip resistor-capacitor which includes a substrate, a resistor layer, a first dielectric layer, a first thin-film capacitor layer, a first terminal electrode and a second terminal electrode. The resistor layer is disposed over the substrate. The first dielectric layer disposed over the resistor layer. The first thin-film capacitor layer is disposed on the first dielectric layer, and has a first capacitor electrode and second capacitor electrode that are physically separated with respect to each other. The first terminal electrode is disposed on a first side edge of the substrate, and is coupled to the resistor layer and the first capacitor electrode. The second terminal electrode is disposed on a second side edge of the substrate opposite to the first side edge, and is coupled to the resistor layer and the second capacitor electrode.

In accordance with one or more embodiments of the present disclosure, the first capacitor electrode and the second capacitor electrode are comb-shaped electrodes, and electrode branches of the first capacitor electrode and electrode branches of the second capacitor electrode are alternately disposed.

In accordance with one or more embodiments of the present disclosure, the thin-film chip resistor-capacitor further includes a second dielectric layer which is disposed on the first thin-film capacitor layer and covering the electrode branches of the first capacitor electrode and the electrode branches of the second capacitor electrode.

In accordance with one or more embodiments of the present disclosure, the second dielectric layer includes resin, epoxy resin, benzocyclobutene (BCB), polytetrafluoroethylene (PTFE), polyimide (PI), $Ta_2O_5$, TaN or $TiO_2$.

In accordance with one or more embodiments of the present disclosure, the first thin-film capacitor layer includes copper or silver.

In accordance with one or more embodiments of the present disclosure, the thin-film chip resistor-capacitor further includes a second thin-film capacitor layer which is disposed on another side of the substrate opposite to the resistor layer. The second thin-film capacitor layer includes a third capacitor electrode and a fourth capacitor electrode that are physically separated and are respectively coupled to the first terminal electrode and the second terminal electrode.

In accordance with one or more embodiments of the present disclosure, the third capacitor electrode and the fourth capacitor electrode are comb-shaped electrodes, and electrode branches of the third capacitor electrode and electrode branches of the fourth capacitor electrode are alternately disposed.

In accordance with one or more embodiments of the present disclosure, the thin-film chip resistor-capacitor further includes a third dielectric layer which is disposed on the second thin-film capacitor layer and covering the electrode branches of the third capacitor electrode and the electrode branches of the fourth capacitor electrode.

In accordance with one or more embodiments of the present disclosure, the third dielectric layer includes resin, epoxy resin, benzocyclobutene BCB, PTFE, PI, $Ta_2O_5$, TaN or $TiO_2$.

In accordance with one or more embodiments of the present disclosure, the second thin-film capacitor layer includes copper or silver.

In accordance with one or more embodiments of the present disclosure, the resistor layer is a thin-film alloy foil sheet.

In accordance with one or more embodiments of the present disclosure, the first dielectric layer includes resin, epoxy resin, BCB, PTFE, PI, $Ta_2O_5$, TaN or $TiO_2$.

Another aspect of the present disclosure is directed to a method of fabricating a thin-film chip resistor-capacitor including: providing a substrate; forming a resistor layer on the substrate; forming a first dielectric layer on the resistor layer; forming a first thin-film capacitor layer on the first dielectric layer, the first thin-film capacitor layer comprising a first capacitor electrode and a second capacitor electrode that are physically separated with respect to each other; forming a first terminal electrode on a first side edge of the substrate, the first terminal electrode coupled to the resistor layer and the first capacitor electrode; and forming a second terminal electrode on a second side edge of the substrate opposite to the first side edge, the second terminal electrode coupled to the resistor layer and the second capacitor electrode.

In accordance with one or more embodiments of the present disclosure, the resistor layer is formed by attaching, printing or physical vapor deposition.

In accordance with one or more embodiments of the present disclosure, the method further includes: forming a second dielectric layer on the first thin-film capacitor layer, the second dielectric layer covering electrode branches of the first capacitor electrode and electrode branches of the second capacitor electrode.

In accordance with one or more embodiments of the present disclosure, the first and second dielectric layers are formed by coating, photoresist dry film lamination or printing.

In accordance with one or more embodiments of the present disclosure, the method further includes: forming a second thin-film capacitor layer on another side of the substrate opposite to the resistor layer, the second thin-film capacitor layer comprising a third capacitor electrode and a fourth capacitor electrode that are physically separated with respect to each other and are respectively coupled to the first terminal electrode and the second terminal electrode.

In accordance with one or more embodiments of the present disclosure, the first to fourth capacitor electrodes are formed by patterning conductive layers respectively on the substrate and the resistor layer.

In accordance with one or more embodiments of the present disclosure, the method further includes: forming a third dielectric layer on the second thin-film capacitor layer, the third dielectric layer covering electrode branches of the third capacitor electrode and electrode branches of the fourth capacitor electrode.

In accordance with one or more embodiments of the present disclosure, the third dielectric layer is formed by coating, photoresist dry film lamination or printing.

BRIEF DESCRIPTION OF THE DRAWINGS

The foregoing aspects and many of the accompanying advantages of this disclosure will become more readily appreciated as the same becomes better understood by reference to the following detailed description, when taken in conjunction with the accompanying drawings.

DETAILED DESCRIPTION

The detailed explanation of the disclosure is described as following. The described preferred embodiments are presented for purposes of illustrations and description, and they are not intended to limit the scope of the disclosure.

Terms used herein are only used to describe the specific embodiments, which are not used to limit the claims appended herewith. Unless limited otherwise, the term "a," "an," "one" or "the" of the single form may also represent the plural form.

It will be understood that, although the terms "first," "second," "third" . . . etc., may be used herein to describe various elements and/or components, these elements and/or components, should not be limited by these terms. These terms are only used to distinguish elements and/or components.

Figure 1:
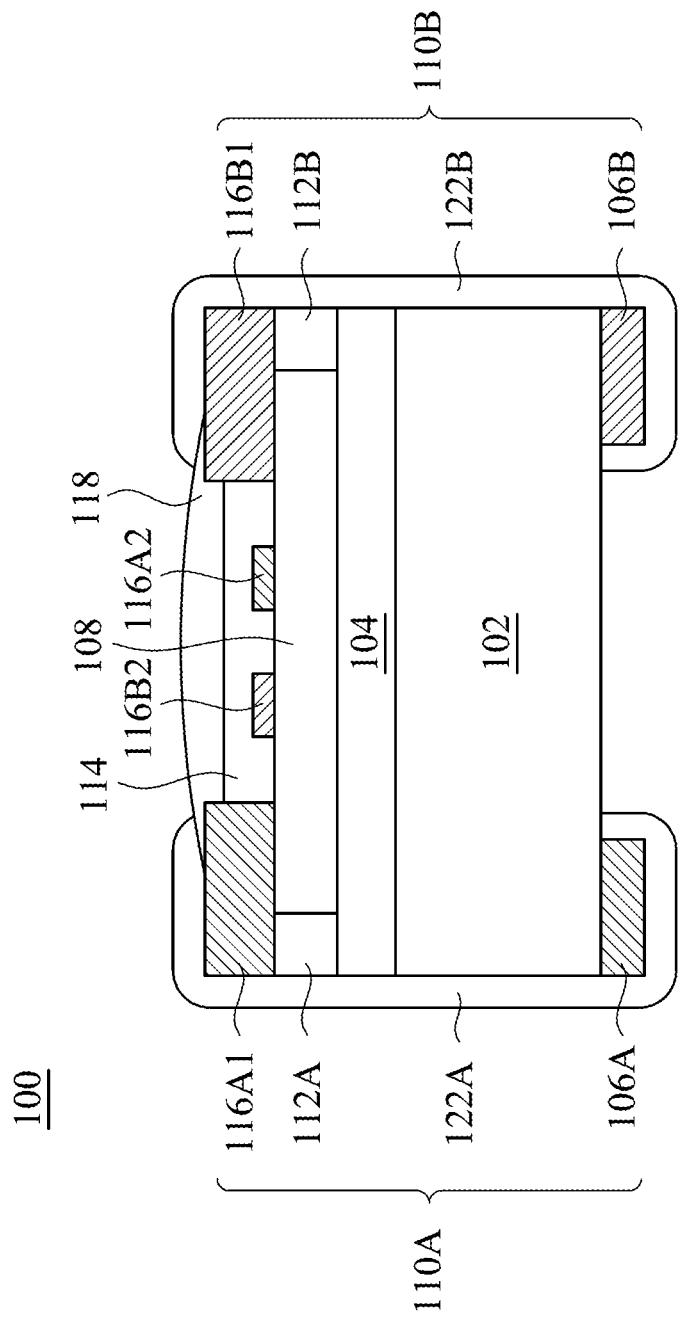
FIG. 1 is a cross-sectional diagram of a thin-film chip resistor-capacitor in accordance with one embodiment of the present disclosure.

FIG. 1 is a cross-sectional diagram of a thin-film chip resistor-capacitor 100 in accordance with one embodiment of the present disclosure. The thin-film chip resistor-capacitor 100 includes a substrate 102, a resistor layer 104, lower electrodes 106A, 106B, the first dielectric layer 108, first upper electrodes 112A, 112B, a second dielectric layer 114, second upper electrodes 116A1, 116B1, electrode branches 116A2, 116B2, a protective layer 118 and side electrodes 122A, 122B. The substrate 102 may be, for example, an aluminum oxide substrate, a ceramic substrate, or another suitable insulating substrate. The resistor layer 104 and the lower electrodes 106A, 106B are respectively disposed at the upper side, the lower-left side and the lower-right side of the substrate 102, in which the resistor layer 104 is a thin-film alloy foil sheet that may include, for example, a silver-copper alloy, a nickel-chromium-copper alloy, a nickel-chromium-silicon alloy, a manganese-copper alloy, a nickel-copper alloy and/or another metal alloy material with similar characteristics, and the lower electrodes 106A, 106B may include, for example, copper, silver, and/or another suitable conductive metal material.

The first dielectric layer 108 and the first upper electrodes 112A, 112B are disposed on the resistor layer 104. The first dielectric layer 108 may include, for example, resin, epoxy resin, benzocyclobutene (BCB), polytetrafluoroethylene (PTFE), polyimide (PI), $Ta_2O_5$, TaN, $TiO_2$ or another suitable interface insulating material. The first upper electrodes 112A, 112B are at the left and right sides of the first dielectric layer 108, respectively, and may include, for example, copper, silver and/or another suitable conductive metal material.

The second dielectric layer 114, the second upper electrodes 116A1, 116B1 and the electrode branches 116A2, 116B2 are disposed on the first dielectric layer 108 and the first upper electrodes 112A, 112B. The second dielectric layer 114 covers the electrode branches 116A2, 116B2, and may also include, for example, resin, epoxy resin, BCB, PTFE, PI, $Ta_2O_5$, TaN, $TiO_2$ or another suitable interface insulating material. The second upper electrodes 116A1, 116B1 are respectively at the left and right sides of the second dielectric layer 114, and respectively contact the first upper electrodes 112A, 112B. The electrode branches 116A2, 116B2 are all between the second upper electrodes 116A1, 116B1, and are coupled to the second upper electrodes 116A1, 116B1, respectively. In addition, the combination of the second upper electrode 116A1 and the electrode branches 116A2 and the combination of the second upper electrode 116B1 and the electrode branches 116B2 are two opposite capacitor electrodes, respectively. The capacitor electrodes are physically separated, and gaps between the second upper electrodes 116A1, 116B1 and the electrode branches 116A2, 116B2 are filled with the second dielectric layer 114, such that the second upper electrode 116A1 and the electrode branches 116A2 may interact with the second upper electrode 116B1 and the electrode branches 116B2 to form a thin-film capacitor layer. Likewise, the second upper electrodes 116A1, 116B1 and the electrode branches 116A2, 116B2 may also include, for example, copper, silver and/or another suitable conductive metal material.

The protective layer 118 is disposed on the second dielectric layer 114, the second upper electrodes 116A1, 116B1 and the electrode branches 116A2, 116B2, and covers the second dielectric layer 114 and the electrode branches 116A2, 116B2, so as to further protect the underlying elements of the electrode branches 116A2, 116B2 and the resistor layer 104. The protective layer 118 may include resin, epoxy resin, ink, BCB, PI, solder resist, and/or another suitable material.

The side electrode 122A extends to be disposed on the lower electrode 106A, the left side of the substrate 102, the left side of the resistor layer 104, the left side of the first upper electrode 112A and the second upper electrode 116A1, and is coupled to the resistor layer 104, the second upper electrode 116A1 and the electrode branches 116A2. The side electrode 122B extends to be disposed on the lower electrode 106B, the right side of the substrate 102, the right side of the resistor layer 104, the right side of the first upper electrode 112B and the second upper electrode 116B1, and is coupled to the resistor layer 104, the second upper electrode 116B1 and the electrode branches 116B2. Specifically, one terminal of the side electrode 122A is disposed on the second upper electrode 116A1 and covers the second upper electrode 116A1 and a portion of the protective layer 118, and extends to the lower electrode 106A along the left sides of the first upper electrode 112A, the resistor layer 104 and the substrate 102 in sequence, such that the other terminal of the side electrode 122A covers the lower electrode 106A. Similarly, one terminal of the side electrode 122B is disposed on the second upper electrode 116B1 and covers the second upper electrode 116B1 and a portion of the protective layer 118, and extends to the lower electrode 106B along the right sides of the first upper electrode 112B, the resistor layer 104 and the substrate 102 in sequence, such that the other terminal of the side electrode 122B covers the lower electrode 106B. The side electrodes 122A, 122B may also include, for example, copper, silver and/or another suitable conductive metal material. In some embodiments, a further metal thin-film layer (e.g., tin or nickel) may be plated at the outer sides of the side electrodes 122A, 122B.

In this embodiment, the lower electrode 106A, the first upper electrode 112A, the second upper electrode 116A1 and the side electrode 122A forms a terminal electrode 110A, and the lower electrode 106B, the first upper electrode 112B, the second upper electrode 116B1 and the side electrode 122B forms a terminal electrode 110B. The terminal electrodes 110A, 110B are disposed respectively at two opposite sides of the substrate 102, and are configured as nodes for coupling an external circuit.

Figure 2:
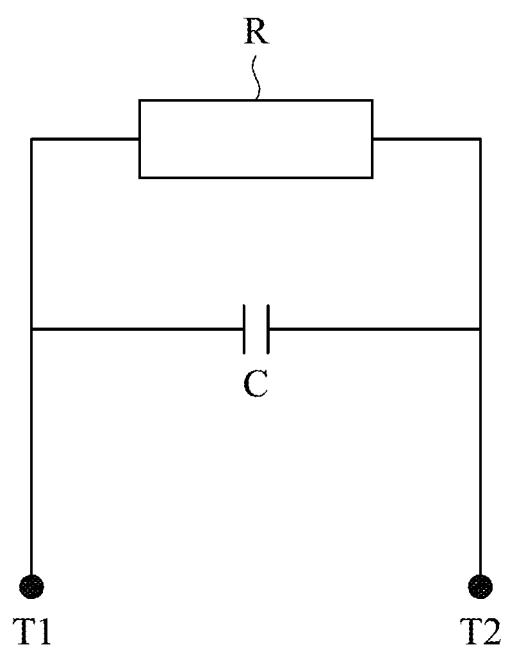
FIG. 2 is an equivalent circuit diagram of the thin-film chip resistor-capacitor in FIG. 1.

The thin-film chip resistor-capacitor 100 is equivalent to a parallel resistor-capacitor circuit. FIG. 2 is an equivalent circuit diagram of the thin-film chip resistor-capacitor 100 shown in FIG. 1. The equivalent circuit diagram shown in FIG. 2 includes a resistor R and capacitor C in parallel with each other, as well as a first terminal T1 and a second terminal T2 respectively coupled to two opposite sides of the resistor R and the capacitor C, in which the resistor R corresponds to the resistor layer 104, the capacitor C corresponds to the second upper electrodes 116A1, 116B1 and the electrode branches 116A2, 116B2, and the first terminal T1 and the second terminal T2 respectively correspond to the terminal electrodes 110A, 110B.

Figure 3:
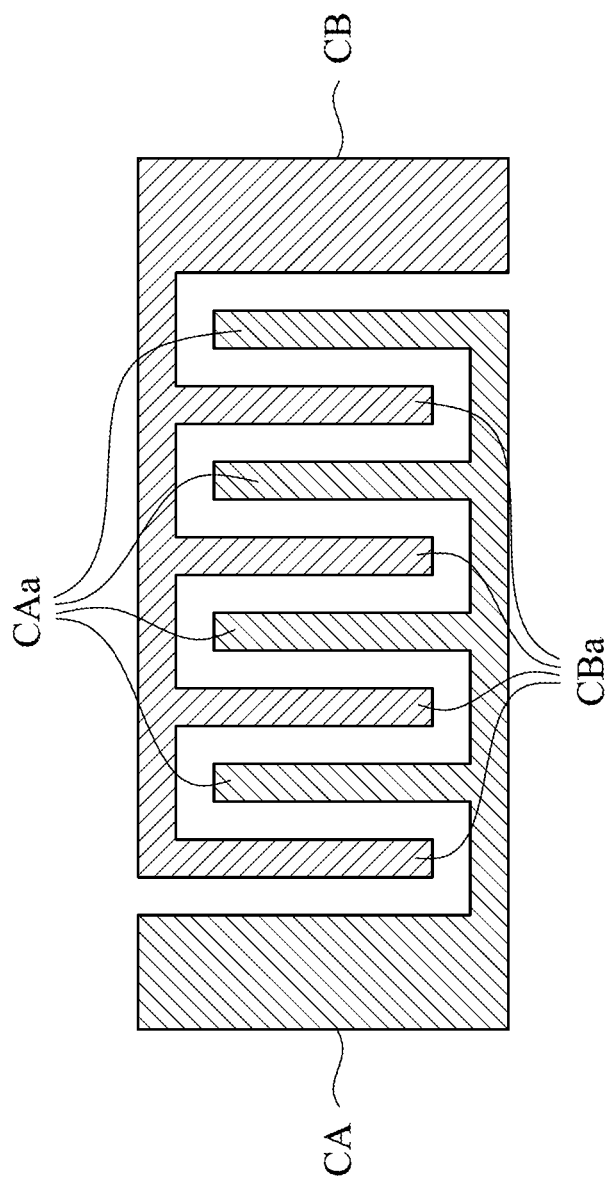
FIG. 3 is an example of a planar structure of the capacitor in FIG. 2.

FIG. 3 is an example of a planar structure of the capacitor C in FIG. 2. The capacitor C includes two opposite capacitor electrodes CA, CB, in which the capacitor electrode CA includes electrode branches CAa, the capacitor electrode CB has electrode branches CBa, and the electrode branches CAa, CBa are staggered with respect to each other. The capacitor electrodes CA, CB are all comb-shaped, and the electrode branches CAa, CBa may respectively correspond to the electrode branches 116A2, 116B2 in FIG. 1. The comb-shaped electrodes illustrated in FIG. 1 and the electrode branches CAa, Cba illustrated in FIG. 3 are merely an example, and the numbers thereof can be adjusted according to design requirements.

Figure 4:
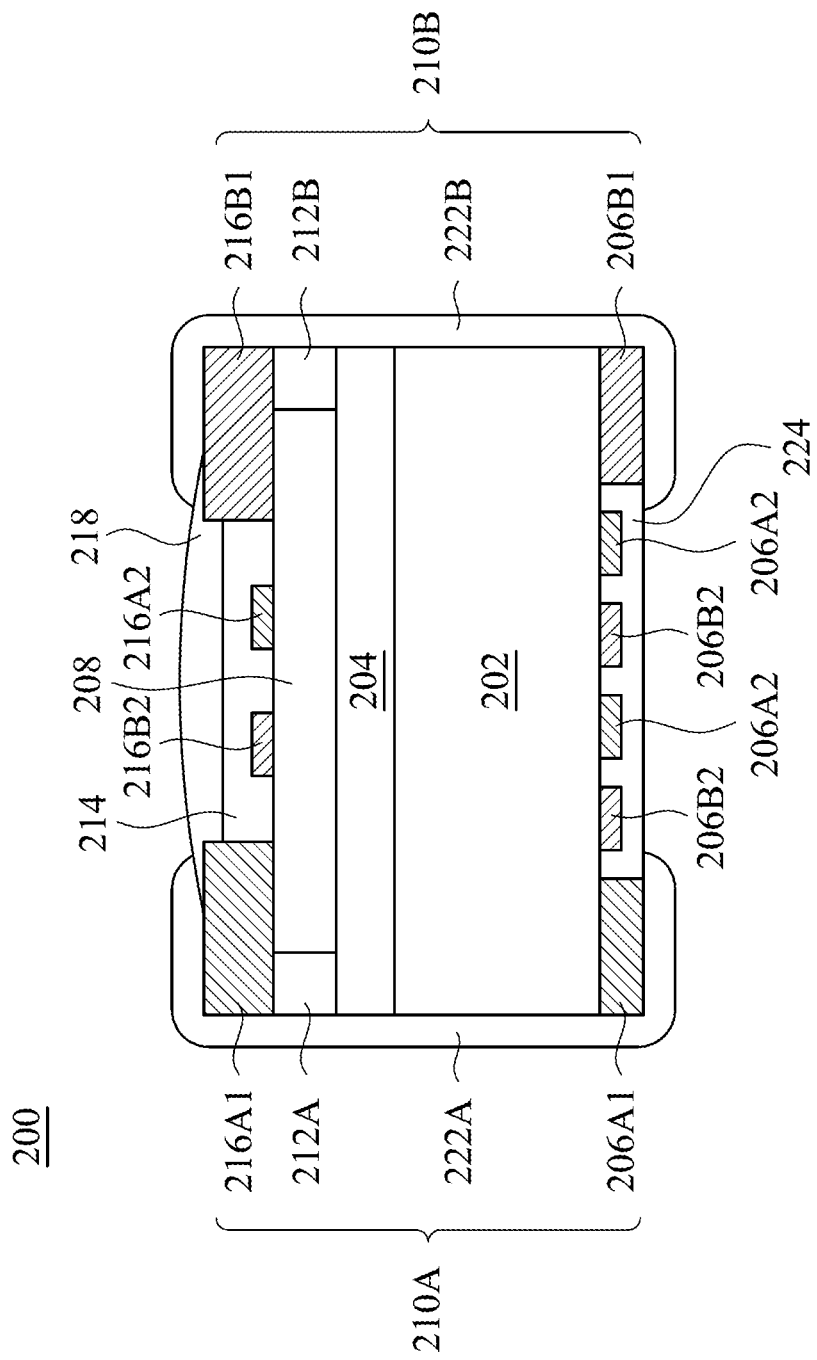
FIG. 4 is a cross-sectional diagram of a thin-film chip resistor-capacitor in accordance with another embodiment of the present disclosure.

FIG. 4 is a cross-sectional diagram of a thin-film chip resistor-capacitor 200 in accordance with another embodiment of the present disclosure. The thin-film chip resistor-capacitor 200 includes a substrate 202, a resistor layer 204, lower electrodes 206A1, 206B1, lower electrode branches 206A2, 206B2, a first dielectric layer 208, first upper electrodes 212A, 212B, a second dielectric layer 214, second upper electrodes 216A1, 216B1, upper electrode branches 216A2, 216B2, a protective layer 218, side electrodes 222A, 222B and a third dielectric layer 224. In comparison with the thin-film chip resistor-capacitor 100 in FIG. 1, in FIG. 4, the thin-film chip resistor-capacitor 200 further includes the lower electrode branches 206A2, 206B2 and the third dielectric layer 224 underneath the substrate 202, in which the lower electrode branches 206A2, 206B2 are respectively coupled to the lower electrodes 206A1, 206B1, and the third dielectric layer 224 covers the lower electrode branches 206A2, 206B2. The third dielectric layer 224 may also include, for example, resin, epoxy resin, BCB, PTFE, PI, $Ta_2O_5$, TaN, $TiO_2$ or another suitable interface insulating material. The lower electrode branches 206A2, 206B2 are all between the lower electrodes 206A1, 206B1 and respectively coupled to the lower electrodes 206A1, 206B1. In addition, the combination of the lower electrode 206A1 and the lower electrode branches 206A2 and the combination of the lower electrode 206B1 and the lower electrode branches 206B2 are two opposite capacitor electrodes, respectively. The capacitor electrodes are physically separated, and gaps between the lower electrodes 206A1, 206B1 and the lower electrode branches 206A2, 206B2 are filled with the third dielectric layer 224, such that the lower electrode 206A1 and the lower electrode branches 206A2 may interact with the lower electrode 206B1 and the lower electrode branches 206B2 to form a thin-film capacitor layer. The combination of the lower electrode 206A1 and the lower electrode branches 206A2 and the combination of the lower electrode 206B1 and the lower electrode branches 206B2 may have the comb-shaped structures of the capacitor electrodes CA, CB shown in FIG. 3, respectively, in which the lower electrode branches 206A2, 206B2 respectively correspond to the electrode branches CAa, CBa. Likewise, the lower electrode branches 206A2, 206B2 may also include, for example, copper, silver and/or another suitable conductive metal material.

The substrate 202, the resistor layer 204, the lower electrodes 206A1, 206B1, the first dielectric layer 208, the terminal electrodes 210A, 210B, the first upper electrodes 212A, 212B, the second dielectric layer 214, the second upper electrodes 216A1, 216B1, the upper electrodes branches 216A2, 216B2, the protective layer 218 and the side electrodes 222A, 222B may be the same as or similar to the substrate 102, the resistor layer 104, the lower electrode 106A, 106B, the first dielectric layer 108, the terminal electrodes 110A, 110B, the first upper electrodes 112A, 112B, the second dielectric layer 114, the second upper electrodes 116A1, 116B1, the electrode branches 116A2, 116B2, the protective layer 118 and the side electrodes 122A, 122B shown in FIG. 1, respectively, and thus the related descriptions may be referred to the preceding paragraphs and are not repeated herein.

Figure 5:
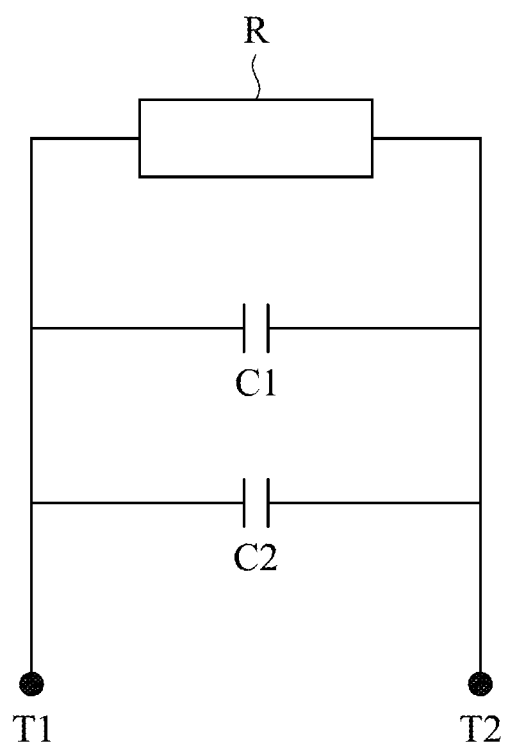
FIG. 5 is an equivalent circuit diagram of the thin-film chip resistor-capacitor in FIG. 4.

The thin-film chip resistor-capacitor 200 is equivalent to a parallel resistor-capacitor circuit. FIG. 5 is an equivalent circuit diagram of the thin-film chip resistor-capacitor 200 in FIG. 4. The equivalent circuit diagram shown in FIG. 5 includes a resistor R and capacitors C1, C2 in parallel with each other, as well as a first terminal T1 and a second terminal T2 respectively coupled to two opposite sides of the resistor R and the capacitors C1, C2, in which the resistor R corresponds to the resistor layer 204, the capacitor C1 corresponds to the second upper electrodes 216A1, 216B1 and upper electrode branches 216A2, 216B2, the capacitor C2 corresponds to the lower electrodes 206A1, 206B1 and the lower electrode branches 206A2, 206B2, and the first terminal T1 and the second terminal T2 respectively correspond to the terminal electrodes 210A, 210B. With the thin-film capacitor layers respectively at the upper and lower sides of the thin-film chip resistor-capacitor 200, the capacitance thereof may further be increased.

Figure 6A:
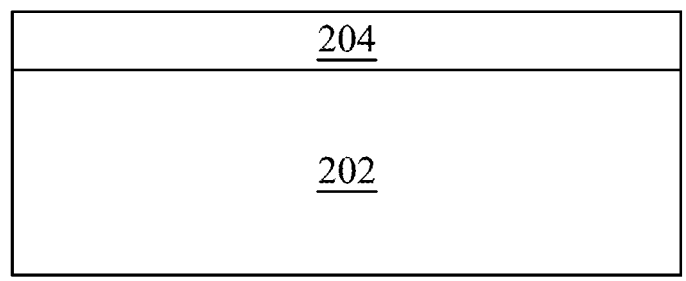
FIGS. 6A-6F are cross-sectional diagrams at various stages of fabricating the thin-film chip resistor-capacitor in FIG. 4.

FIGS. 6A-6F are cross-sectional diagrams at various stages of fabricating the thin-film chip resistor-capacitor 200 in FIG. 4. First, as shown in FIG. 6A, a substrate 202 is provided, and a resistor layer 204 is formed on the substrate 202. The resistor layer 204 may be formed on the substrate 202 by a method such as attaching, printing or physical vapor deposition (e.g., sputtering), depending on the material thereof.

Figure 6B:
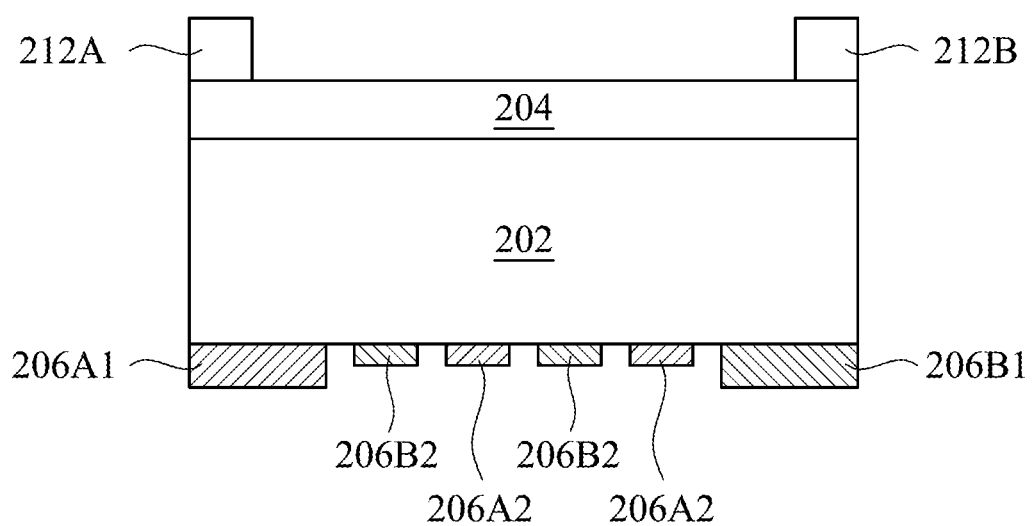

Then, as shown in FIG. 6B, first upper electrodes 212A, 212B are formed on the resistor layer 204, and lower electrodes 206A1, 206B1 and lower electrode branches 206A2, 206B2 are formed on a side of the substrate 202 opposite to the resistor layer 204. The lower electrodes 206A1, 206B1, the lower electrode branches 206A2, 206B2 and the first upper electrodes 212A, 212B may be formed by the following methods. First, a process such as sputtering or thin-film attaching is performed to form conductive layers respectively on the substrate 202 and the resistor layer 204, then a lithography process and an etching process are performed to pattern the formed conductive layer for removing unnecessary portions, and then an electroplating process is performed so that the lower electrodes 206A1, 206B1, the lower electrode branches 206A2, 206B2 and the first upper electrodes 212A, 212B are formed. The lithography process and the etching process may be performed to remove materials of different thicknesses at various areas, such that the thickness of the lower electrode branches 206A2, 206B2 is less than the thickness of the lower electrodes 206A1, 206B1. In another embodiment, the lower electrodes 206A1, 206B1, the lower electrode branches 206A2, 206B2 and the first upper electrodes 212A, 212B may be formed by printing.

Figure 6C:
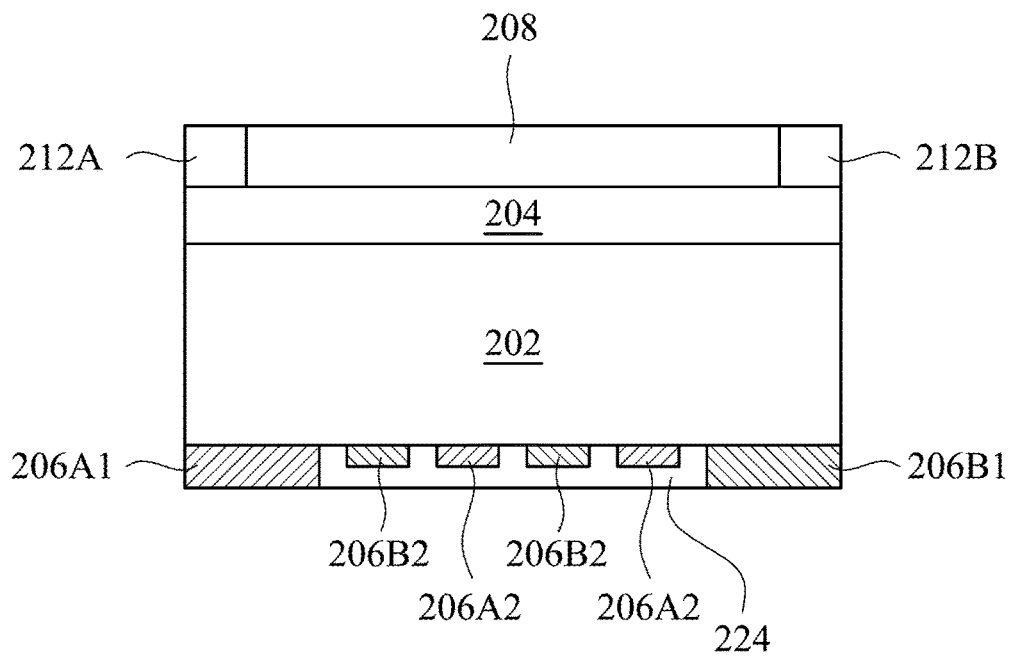

Afterwards, as shown in FIG. 6C, a first dielectric layer 208 is formed on a portion of the resistor layer 204 uncovered by the first upper electrodes 212A, 212B, and a third dielectric layer 224 is formed on a portion of the substrate 202 uncovered by the lower electrodes 206A1, 206B1. The first dielectric layer 208 and the third dielectric layer 224 may be formed by a technique such as coating, photoresist dry film lamination or printing, depending on the material thereof. The tops of first dielectric layer 208 and the first upper electrodes 212A, 212B may be coplanar, and the tops of the formed third dielectric layer 224 and the lower electrodes 206A1, 206B1 may be coplanar.

Figure 6D:
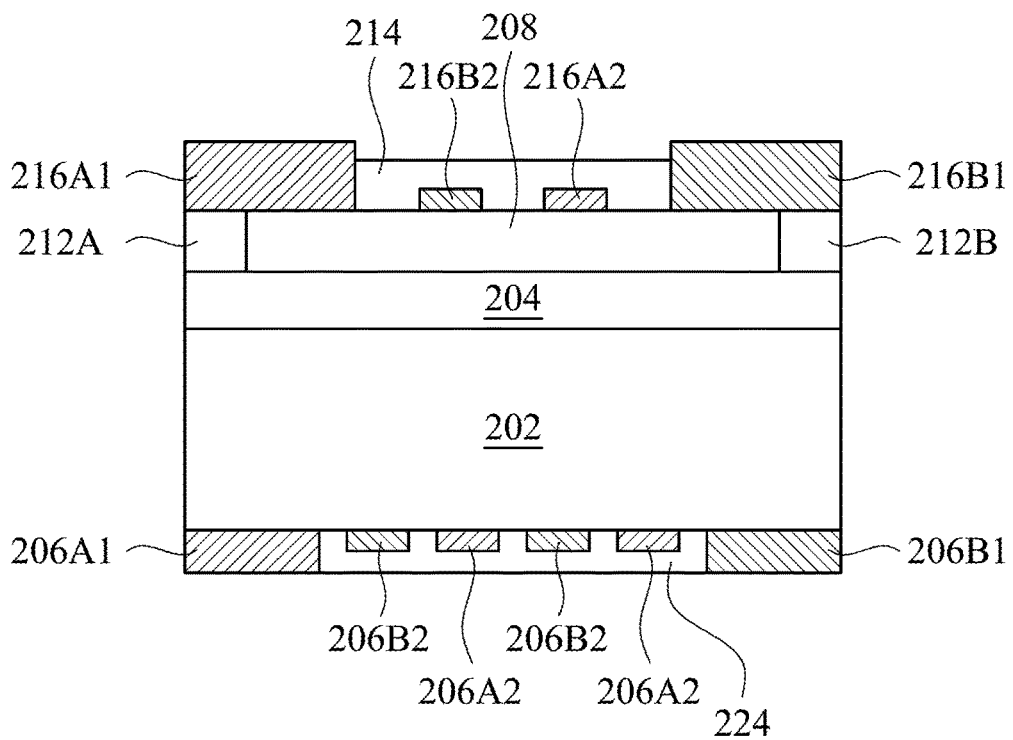

Then, as shown in FIG. 6D, second upper electrodes 216A1, 216B1 and upper electrode branches 216A2, 216B2 are formed on the first dielectric layer 208 and the first upper electrodes 212A, 212B, and subsequently a second dielectric layer 214 is formed between the second upper electrodes 216A1, 216B1 and covering the upper electrode branches 216A2, 216B2. The second upper electrodes 216A1, 216B1, the upper electrode branches 216A2, 216B2 and the second dielectric layer 214 may be formed via the following steps.

Firstly, a conductive layer is formed on the first dielectric layer 208 and the first upper electrodes 212A, 212B by, for example, sputtering or thin-film attaching, and then a lithography process and an etching process are performed to pattern the formed conductive layer for removing unnecessary portions, and then an electroplating process is performed so that the second upper electrodes 216A1, 216B1 and the upper electrode branches 216A2, 216B2 are formed. The lithography process and the etching process may be performed to remove materials of different thicknesses at various areas, such that the thickness of the upper electrode branches 216A2, 216B2 is less than the thickness of the second upper electrodes 216A1, 216B1. In another embodiment, the second upper electrodes 216A1, 216B1 and the upper electrode branches 216A2, 216B2 may be formed by printing. The second dielectric layer 214 may be formed by a technique such as coating, photoresist dry film lamination or printing, depending on the material thereof. The top of the formed second dielectric layer 214 may be lower than or flush with the top of the second upper electrodes 216A1, 216B1, and may be higher than or flush with the top of the upper electrode branches 216A2, 216B2.

Figure 6E:
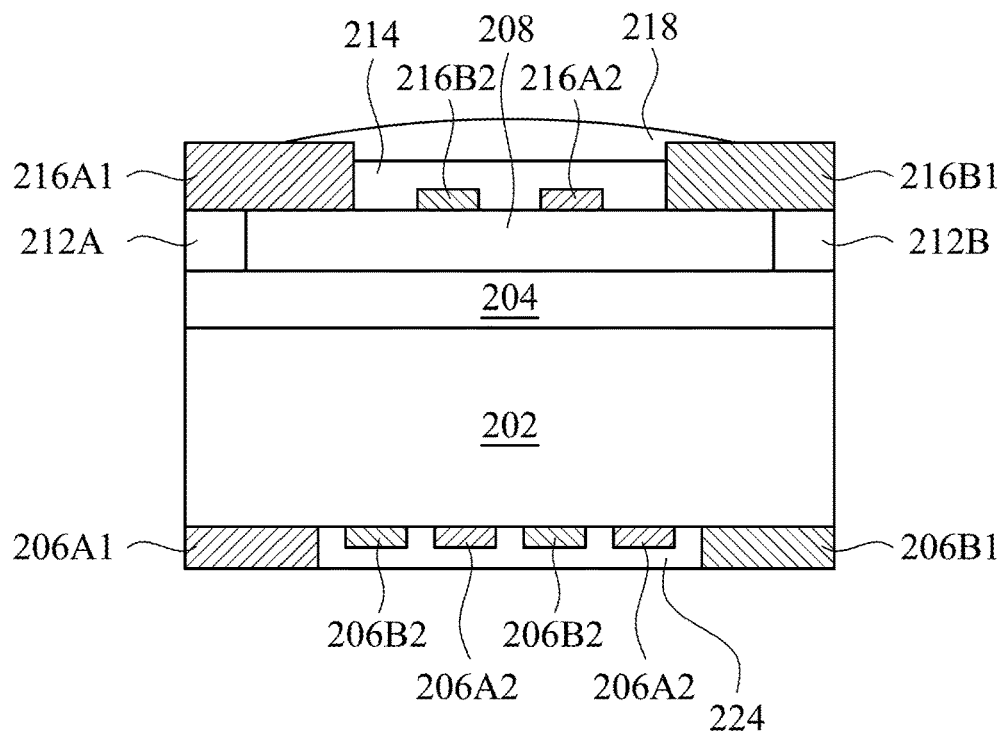

Afterwards, as shown in FIG. 6E, a protective layer 218 is formed on the second dielectric layer 214 and the second upper electrodes 216A1, 216B1. The formed protective layer 218 covers the second dielectric layer 214, the upper electrode branches 216A2, 216B2 and a portion of the second upper electrodes 216A1, 216B1. The protective layer 218 may be formed by a technique such as coating, photoresist dry film lamination or printing, depending on the material thereof.

Figure 6F:
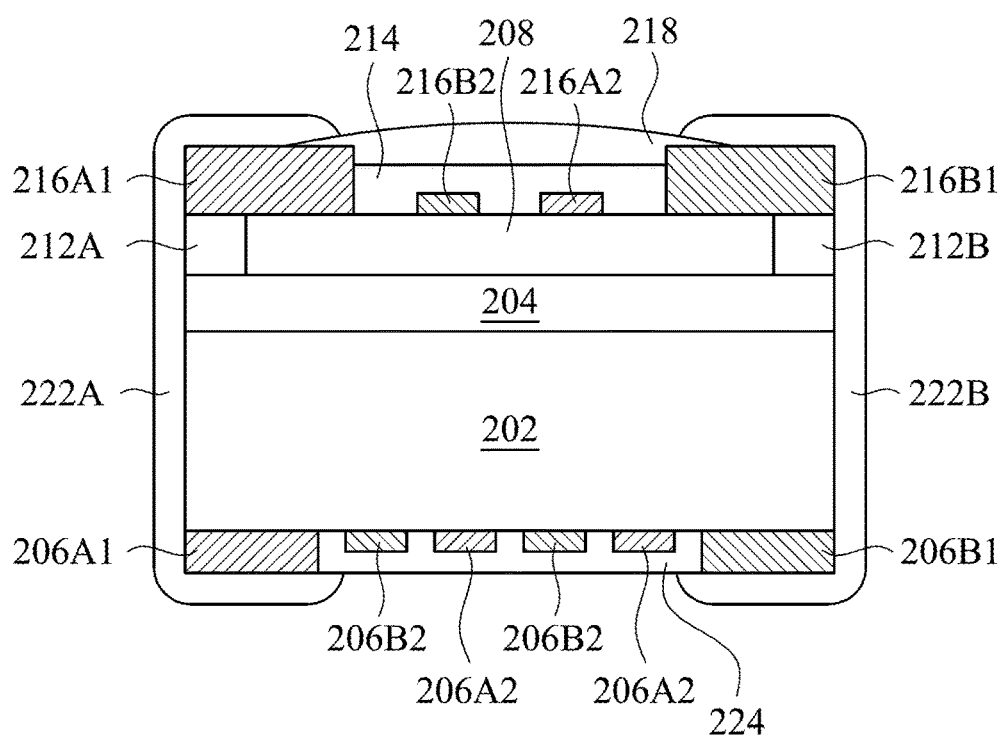

Then, as shown in FIG. 6F, a side electrode 222A is formed at the left sides of the substrate 202, the resistor layer 204, the lower electrode 206A1, the first upper electrode 212A and the second upper electrode 216A1, and a side electrode 222B is formed at the right sides of the substrate 202, the resistor layer 204, the lower electrode 206B1, the first upper electrode 212B and the second upper electrode 216B1. The side electrodes 222A, 222B may be formed respectively at the left and right sides of the substrate 202 and the resistor layer 204 by sputtering. The side electrode 222A extends upward to the protective layer 218 and downward to the third dielectric layer 224, and covers the second upper electrode 216A1 and the lower electrode 206A1. The side electrode 222B extends upward to the protective layer 218 and downward to the third dielectric layer 224, and covers the second upper electrode 216B1 and the lower electrode 206B1. In some embodiments, a further metal thin-film layer (e.g., tin or nickel) may be plated at the outer sides of the side electrodes 222A, 222B.

The thin-film chip resistor-capacitor 100 in FIG. 1 may be fabricated in a manner similar to that described in the above paragraphs accompanying FIGS. 6A-6F. The capacitor electrodes of the thin-film chip resistor-capacitor 100 are disposed at only one side of the substrate 102, and thus there is no need to form electrode branches and a dielectric layer on the other side of the substrate 102 relative to the resistor layer 104; the steps of forming the other elements may be the same as those illustrated in FIGS. 6A-6F, and thus are not repeated herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A thin-film chip resistor-capacitor, comprising:
a substrate;
a resistor layer disposed over the substrate;
a first dielectric layer disposed over the resistor layer;
a first thin-film capacitor layer disposed on the first dielectric layer, the first thin-film capacitor layer having a first capacitor electrode and a second capacitor electrode that are physically separated with respect to each other;
a first terminal electrode disposed on a first side edge of the substrate and coupled to the resistor layer and the first capacitor electrode;
a second terminal electrode disposed on a second side edge of the substrate opposite to the first side edge and coupled to the resistor layer and the second capacitor electrode; and
a second thin-film capacitor layer disposed on another side of the substrate opposite to the resistor layer, the second thin-film capacitor layer comprising a third capacitor electrode and a fourth capacitor electrode that are physically separated and are respectively coupled to the first terminal electrode and the second terminal electrode.

2. The thin-film chip resistor-capacitor of claim 1, wherein the first capacitor electrode and the second capacitor electrode are comb-shaped electrodes, and electrode branches of the first capacitor electrode and electrode branches of the second capacitor electrode are alternately disposed.

3. The thin-film chip resistor-capacitor of claim 2, further comprising:
a second dielectric layer disposed on the first thin-film capacitor layer and covering the electrode branches of the first capacitor electrode and the electrode branches of the second capacitor electrode.

4. The thin-film chip resistor-capacitor of claim 3, wherein the second dielectric layer includes resin, epoxy resin, benzocyclobutene (BCB), polytetrafluoroethylene (PTFE), polyimide (PI), $Ta_2O_5$, TaN or $TiO_2$.

5. The thin-film chip resistor-capacitor of claim 1, wherein the first thin-film capacitor layer includes copper or silver.

6. The thin-film chip resistor-capacitor of claim 1, wherein the third capacitor electrode and the fourth capacitor electrode are comb-shaped electrodes, and electrode branches of the third capacitor electrode and electrode branches of the fourth capacitor electrode are alternately disposed.

7. The thin-film chip resistor-capacitor of claim 6, further comprising:
a third dielectric layer disposed on the second thin-film capacitor layer and covering the electrode branches of the third capacitor electrode and the electrode branches of the fourth capacitor electrode.

8. The thin-film chip resistor-capacitor of claim 7, wherein the third dielectric layer includes resin, epoxy resin, benzocyclobutene (BCB), PTFE, PI, $Ta_2O_5$, TaN or $TiO_2$.

9. The thin-film chip resistor-capacitor of claim 1, wherein the second thin-film capacitor layer includes copper or silver.

10. The thin-film chip resistor-capacitor of claim 1, wherein the resistor layer is a thin-film alloy foil sheet.

11. The thin-film chip resistor-capacitor of claim 1, wherein the first dielectric layer includes resin, epoxy resin, BCB, PTFE, PI, $Ta_2O_5$, TaN or $TiO_2$.

* * * * *